United States Patent [19]
Vranish

[11] Patent Number: 5,275,261
[45] Date of Patent: Jan. 4, 1994

[54] ELECTROMAGNETIC BRAKE/CLUTCH DEVICE

[75] Inventor: John M. Vranish, Crofton, Md.

[73] Assignee: The United States of America as represented by the Administrator of the National Aeronautics and Space Administration, Washington, D.C.

[21] Appl. No.: 986,632

[22] Filed: Dec. 3, 1992

[51] Int. Cl.⁵ .............................................. F16D 63/00
[52] U.S. Cl. .................................. 188/82.2; 188/82.3; 188/82.84; 188/163; 188/171; 192/44; 192/45.1; 192/90
[58] Field of Search ................... 188/82.3, 82.2, 82.4, 188/82.84, 163, 164, 171, 173; 192/27, 44, 45.1, 90

[56] References Cited

U.S. PATENT DOCUMENTS

| | | | |
|---|---|---|---|
| 1,152,075 | 8/1915 | Buschmann | 192/44 X |
| 1,542,040 | 6/1925 | Lavaud | 192/45.1 |
| 2,299,739 | 10/1942 | Colucci | 192/44 |
| 2,385,799 | 10/1945 | Dodge | 192/45.1 |
| 3,476,226 | 11/1969 | Massey | 192/27 |
| 3,812,936 | 5/1974 | Dane | 188/171 |
| 4,998,605 | 3/1991 | Ferris | 192/45.1 |

Primary Examiner—Douglas C. Butler
Attorney, Agent, or Firm—Paul S. Clohan, Jr.; R. Dennis Marchant; Guy M. Miller

[57] ABSTRACT

An electromagnetic brake/clutch device includes a drive shaft supported by at least one bearing for transmitting torque, a housing, affixed to prevent its rotation, surrounding the drive shaft, and an electromagnetically activated device within the housing to selectively prevent and allow rotation of the drive shaft. The electromagnetically activated device includes a plurality of cammed rollers acting to prevent clockwise rotation of the drive shaft and a plurality of cammed rollers to prevent counter-clockwise rotation of the drive shaft. The drive shaft includes a circumferential disk and the housing includes a reaction ring for engagement with the plurality of cammed rollers. The plurality of cammed rollers are released from engagement with the circumferential disk and the reaction ring by a plurality of tripping mechanisms within the housing. The tripping action uses the locking force to act as a release force merely by changing the boundary conditions of the roller interface angles. The tripping mechanisms include trippers for disengaging the plurality of cammed rollers and an anvil shaped portion for providing lateral movement of the trippers. The plurality of cammed rollers is preloaded to engagement with the circumferential disk and reaction ring by a spring, and is located with respect to an adjacent tripping mechanism with another spring.

8 Claims, 6 Drawing Sheets

ELECTROMAGNETIC BRAKE/CLUTCH DEVICE

ORIGIN OF THE INVENTION

The invention described herein was made by an employee of the United States Government, and may be manufactured and used by or for the Government for governmental purposes without the payment of any royalties thereon or therefor.

TECHNICAL FIELD

This invention relates to rotary devices and more particularly to an electromagnetic brake and clutch device.

BACKGROUND ART

Electromagnetic brakes that depend upon friction for their holding power are commonly used with electric motors and other drives. Some of these devices use hydraulic forces to generate high holding torques. Another commonly used device is a magnetic particle clutch/brake. These type of devices use a magnetic field to align magnetic particles in a gap between rotating members and thus create frictional forces which bind the two members together. The magnetic particles can be steel or iron in a powder form and can be suspended in a liquid.

Prior art electromagnetic friction-hold brakes lack sufficient holding force for many applications. Hydraulic friction-hold brakes have the required holding force, but require a hydraulic system with its associated space, weight, complexity, and potential leaks. Magnetic particle brakes are stronger than standard electromagnetic friction-hold brakes, but are limited in holding strength to around 20 psi. In addition, the particles tend to wear out if the brake is allowed to slip, and they require seals to hold the particles in place and do not fail safe (i.e., locked). A permanent magnet system must be added to the magnetic circuit to obtain a fail safe feature.

STATEMENT OF THE INVENTION

It is therefore an object of the present invention to provide an electromechanical device that can perform as a brake with holding forces greater than prior art devices.

Another object of the present invention is to provide an electromechanical brake that will also operate as a precision torque relief clutch that can release under loads.

These and other objects are achieved by providing a new and novel device using a tripping technique to release locking rollers under load. The locking force is used to act as a release force merely by changing the boundary conditions of the roller interface angles. This system is able to use noise oscillations to open it if the torque is held in a "dead zone" just short of that point at which it will open and just beyond the point at which we wish it to open. New techniques are also employed to reduce a magnetic circuit air gap to a minimum. Locating locking rollers precisely along a circumference of a force/torque reaction ring minimizes the uncertainties of the location of each roller with respect to a tripping mechanism and reduces the throw requirements of the magnetic circuit. This is possible because the locking cams are on the locking rollers, not on the force/torque reaction ring of an output drive shaft. Engaging each locking roller with the reaction ring enables each roller to adjust to wear and normal variations in the output drive shaft by rotation without significantly changing its location with respect to its corresponding tripping mechanism. Using cylindrically shaped surfaces to face the flat surfaces of the corresponding tripping mechanism leaves a tripping gap essentially unchanged as each locking roller rotates to adjust for wear, manufacturing variances in output drive shaft diameters and the expansion/contraction effects of temperature. Also employed is the use of a relatively stiff locating and locking spring to remove roller locating uncertainties and a relatively flexible preload spring to ensure engagement. A dual angle interface or "pinching plane" between the trippers and their respective anvils permits the tripping mechanisms to be wide throw (minimizing the magnetic circuit gap), to operate emersed in a lubricant used in the remainder of the mechanism and still have the equivalent of a high locking coefficient of friction.

A novel technique is also used to provide a smooth, safe and instant disengagement for the locking rollers during unlocking. This is accomplished by using the contact/preload spring to provide a preload force pointed axially towards the tripper throughout the locking/unlocking process and a locating spring which puts a rotational locking motion on each roller and forces each roller towards the reaction ring only when the tripper is not activated. This means that during disengagement, each locking roller stays in contact with the reaction ring throughout and breaks contact with the output drive shaft first. Upon relocking, rotating and engaging the output drive shaft is the last step in the locking process. This prevents locking rollers from inadvertently hanging up and jamming.

Another novel aspect of the invention is using the high frequency response and the efficiency of the device mechanics rather than high force to get accuracy in torque release. This provides precision torque slip as well as large holding torque. No compromise is necessary between holding strength and sensitivity required to release at precisely the desired torque. The device merely monitors the torque it is resisting through sensors between its force/torque reaction ring and the structure it attaches to. At the precise moment, the magnetic circuit is energized and the device slips. Speed ensures release accuracy. The mechanical efficiency inherent in the locking rollers ensures high predictability for the system. The locking/unlocking system can be extended to pulsing the system on and off to hold a steady torque similar to an automotive anti-lock braking system.

BRIEF DESCRIPTION OF THE DRAWINGS

FIG. 1b is a top view of the Trip Roller Clutch of FIG. 1a.

DETAILED DESCRIPTION OF THE INVENTION

Figure 1A:
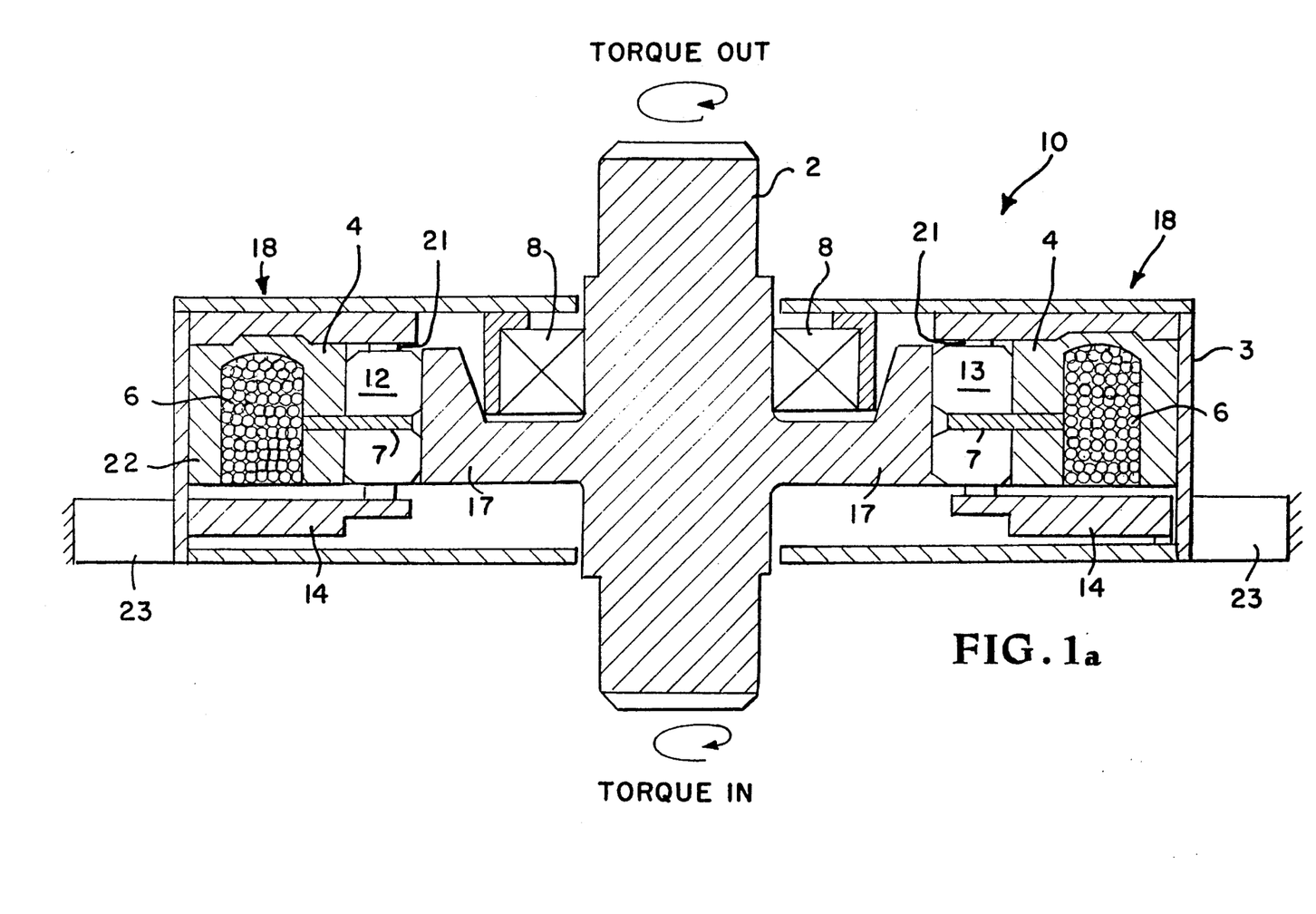
FIG. 1a is a cross-sectional view of a preferred embodiment of a Trip Roller Clutch according to the present inventive concepts.
Figure 1B:
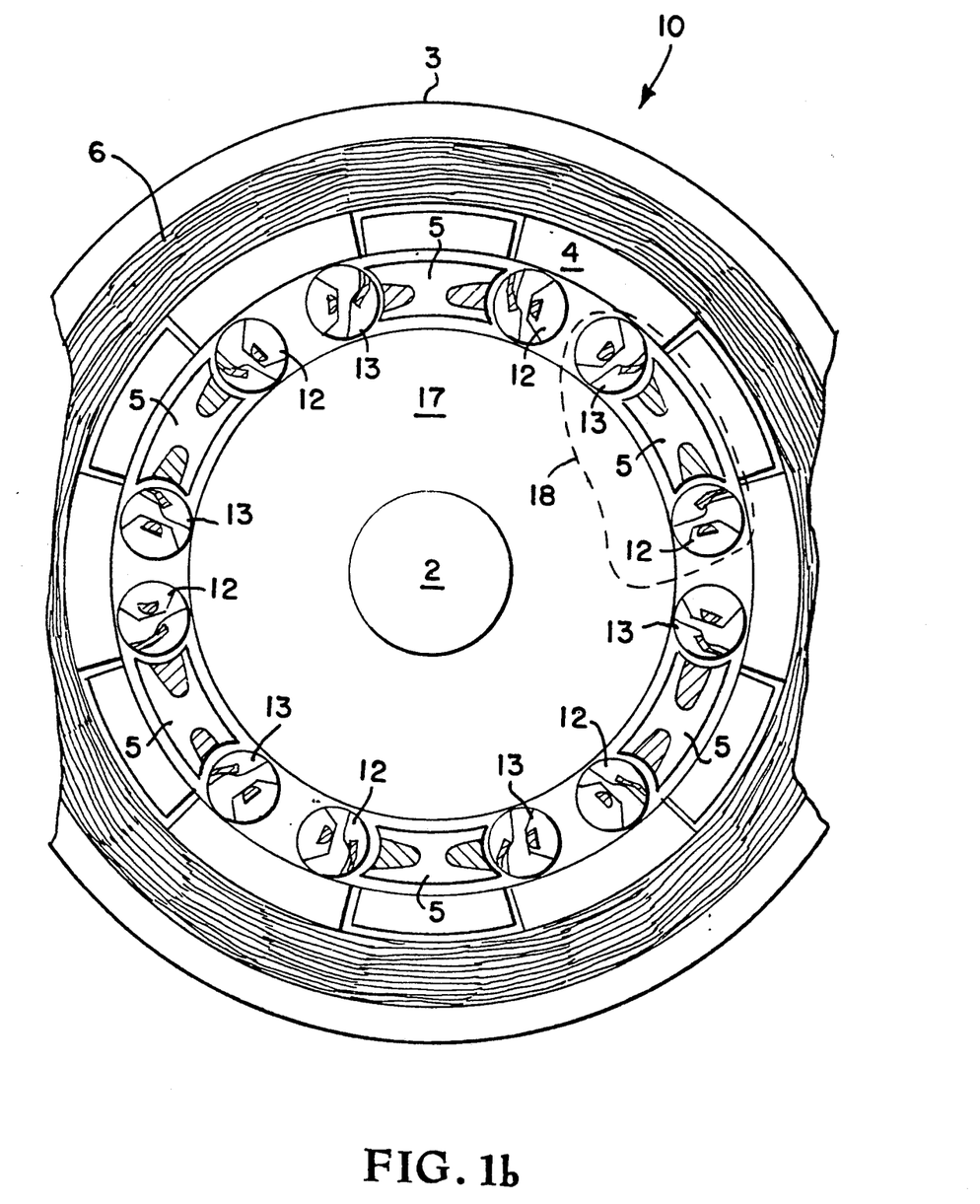

Referring now to FIGS. 1a and 1b, a Trip Roller Clutch 10 according to the present inventive concepts is shown. Trip Roller Clutch 10 consists generally of three main components: output drive shaft 2 having an integral disk portion 17, reaction ring 4, and a number of locking/unlocking mechanisms 18. Output drive shaft 2 is supported in relation to casing 3 by a standard shaft bearing 8, a design well understood in this art. When not locked, output drive shaft 2 is allowed to run freely and true with respect to casing 3 transmitting full torque from one component to another. When locking/unlocking mechanism 18 is engaged (locked), disk 17 is prevented from turning (and likewise output drive shaft 2) and is locked to casing 3, which can be fixed (restrained from rotation) by any suitable means 23 well know in this art. When external forces and torques are encountered, cross-supported bearing 8 will protect the system and permit locking and unlocking to take place unimpaired.

Although roller-locking mechanisms are common in industry and have proven to be very effective, strong and compact, they normally are employed as ONE-WAY over-running clutches, i.e., they roll freely in one direction but lock in the other direction. For this type of mechanism to work as a brake/slip clutch, it must be able to release and engage electromagnetically under load in BOTH directions. This is the advantage of the present invention and is achieved through the design of locking/unlocking mechanism 18. Locking/unlocking mechanism 18 is comprised of the following components: a number of clockwise (CW) locking rollers 13, and equal number of counter-clockwise (CCW) locking rollers 12, and a number of tripping mechanisms 5. A series of windings 6 and a striker disk 14 is also employed in the locking/unlocking of disk 17/output drive shaft 2. Locking rollers 12 and 13 are placed around the circumference of disk 17 such that half of the rollers (every second one) prevent disk 17/output drive shaft 2 from turning with respect to casing 3 in the clockwise direction and the other half of the rollers prevent counter-clockwise rotation. Trip roller clutch 10 thus normally acts as a very powerful brake, but when windings 6 are actuated (supplied with and electrical current) locking rollers 12 and 13 are released and trip roller clutch acts as a free-wheeling slip-clutch.

Figure 6:
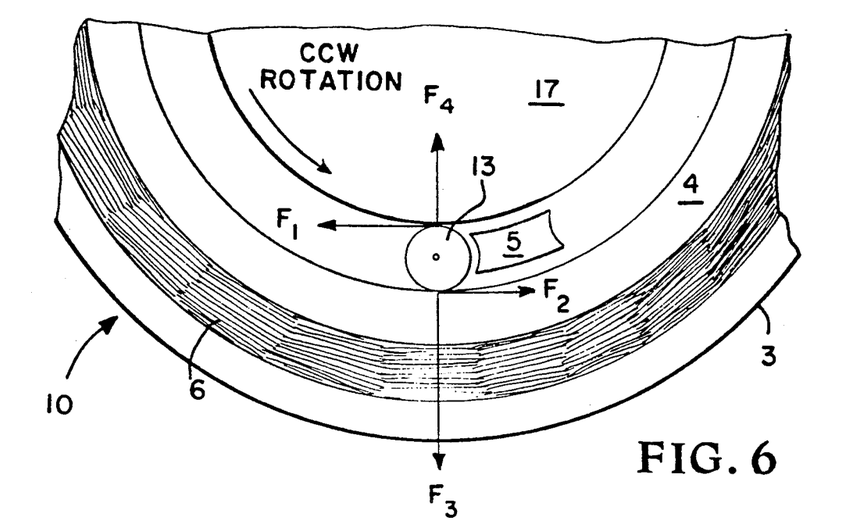
FIG. 6 is a depiction of the forces acting on a counter-clockwise locking roller.

FIG. 6 shows the forces acting on a typical counter-clockwise locking roller 12 on Trip Roller Clutch 10 during roller 12 locking against counter-clockwise rotation. The frictional holding force imparted to disk 17 by locking roller 12 is representative, with all other locking rollers 12 contributing in a similar manner. The clockwise locking rollers 13 roll down their critical angle cams, taking no part in the locking action. There are, therefore, two one-way slip clutches operating back to back. There is a slight gap between the locking rollers and tripping mechanism 5 so this system plays no part in the locking action.

When windings 6 are activated, the elements of tripping mechanism 5 move to eliminate the gap between CW tripper 15, CCW tripper 16 (FIG. 5) and rollers 12, 13. As the CCW rotation continues, a reaction force from each of the trip anvils 20 (FIG. 5) builds up on CCW locking rollers 12, acting to drive each back down its locking cam 11 thereby forcing unlocking/release. The system is thus "tripped" out of lock into release, thus the term "Trip Roller Clutch". Very little force from windings 6 is required to unlock the system and none to lock it. Still, very large forces are involved, all generated by the geometry and structure of the device.

Figure 2:
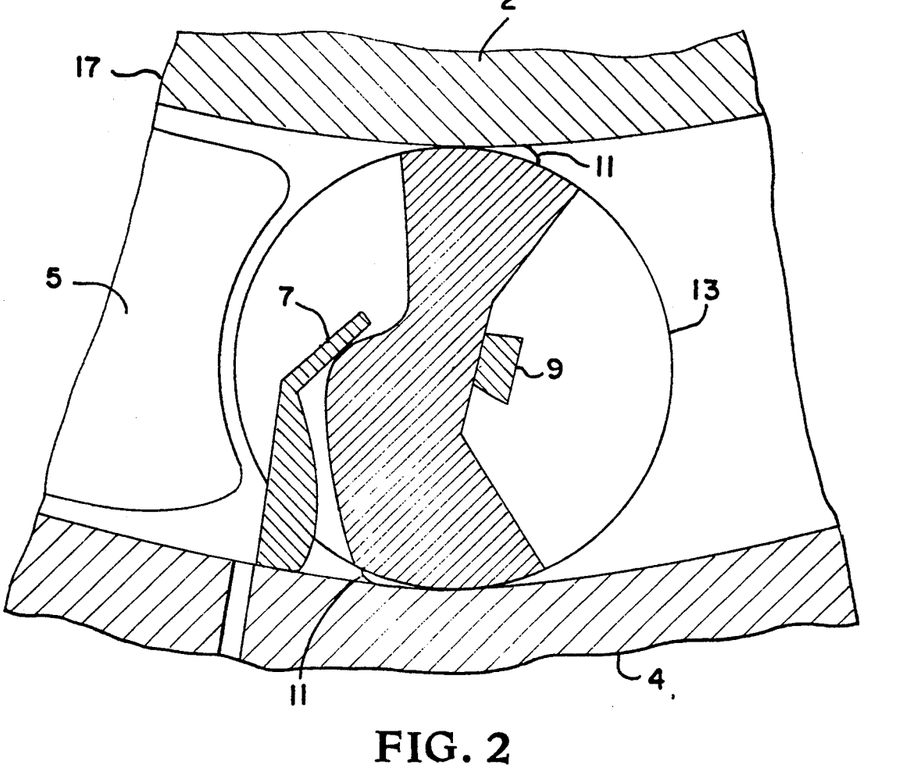
FIG. 2 is a detailed view of one of the clock-wise locking rollers used in the Trip Roller Clutch.
Figure 7:
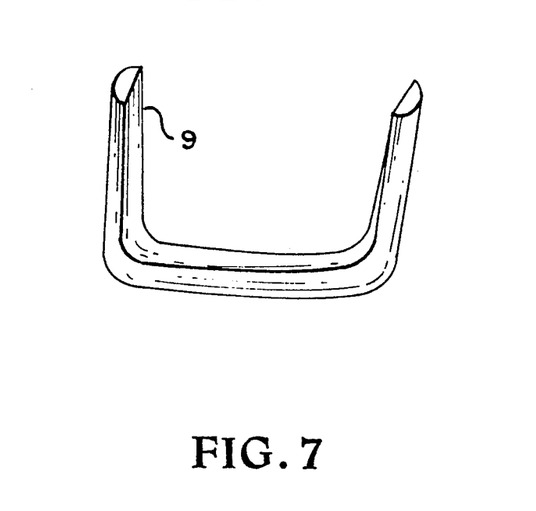
FIG. 7 is a depiction of preload spring 9.

The locking roller 13 illustrated in FIG. 2 locks against clockwise rotation of disk 17/output drive shaft 2. Roller locating spring 7 is used to fix the location of roller 13 relative to trip mechanism 5 thereby precisely setting the locking gap. As depicted in FIGS. 1b and 2, one end of preload spring 9 contacts roller 13, while the other end contacts roller 12. As shown in FIG. 7, preload spring may consists of a U-spring; however it may be any other type of spring which serves the equivalent purpose, such as a common coil spring. Preload spring 9 causes locking roller 13 to rotate counter-clockwise, thereby engaging locking cams 11. These cams rotationally adjust to remain engaged despite wear and variances in the diameter of disk 17 caused by manufacturing imperfections or possibly temperature effects. And, while they adjust, the locking gap relative to each unlocking mechanism 5 remains unchanged. Preload spring 9 also exerts a downward force. Thus, during the tripping/release process, locking roller 13 will remain in contact with reaction ring 4 and will disengage from output drive shaft 2. This ensures a clean disengagement with no chance of snagging, or jamming.

Figure 3:
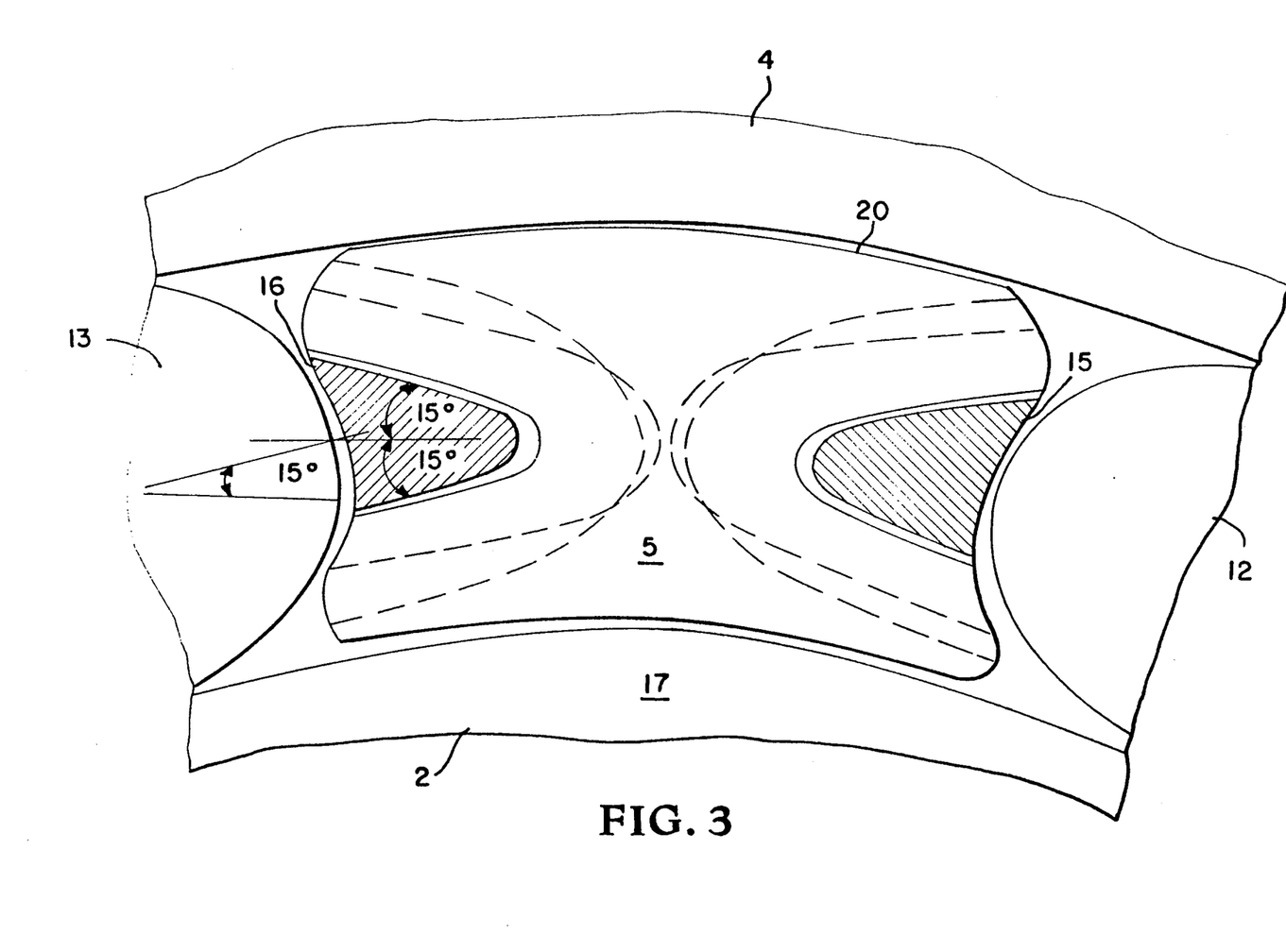
FIG. 3 is a detailed view of one of the tripping mechanisms used in the Trip Roller Clutch.
Figure 4:
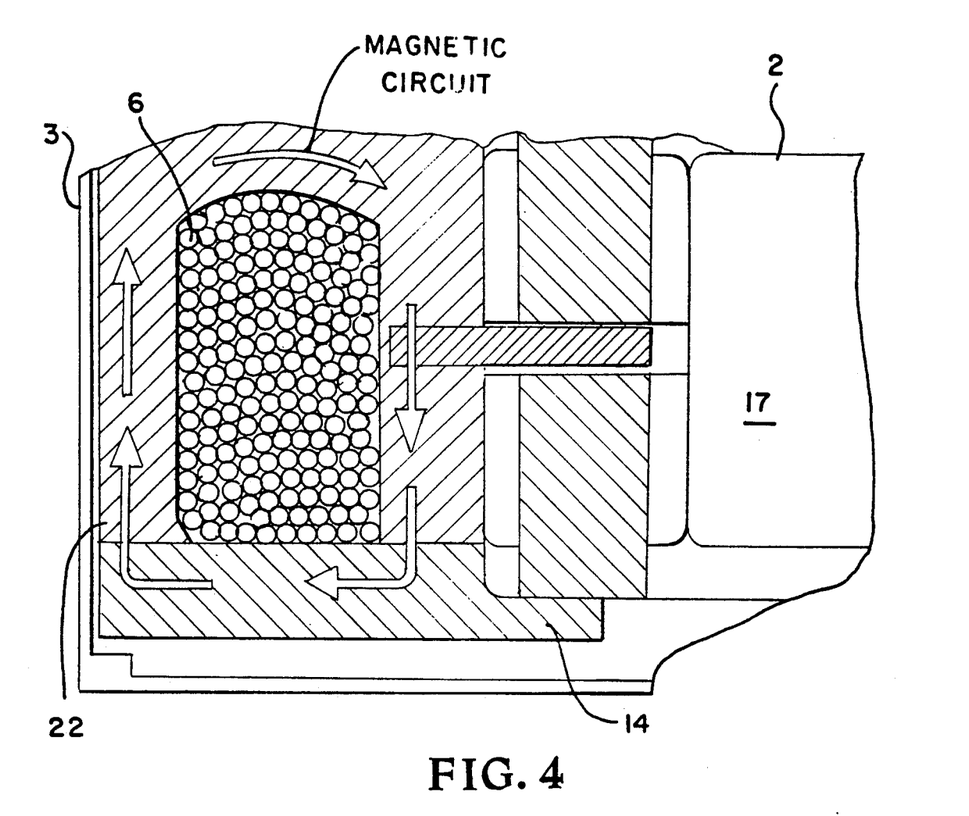
FIG. 4 is a partial cross-sectional view of the electromagnetic activation of the tripping mechanism.
Figure 5:
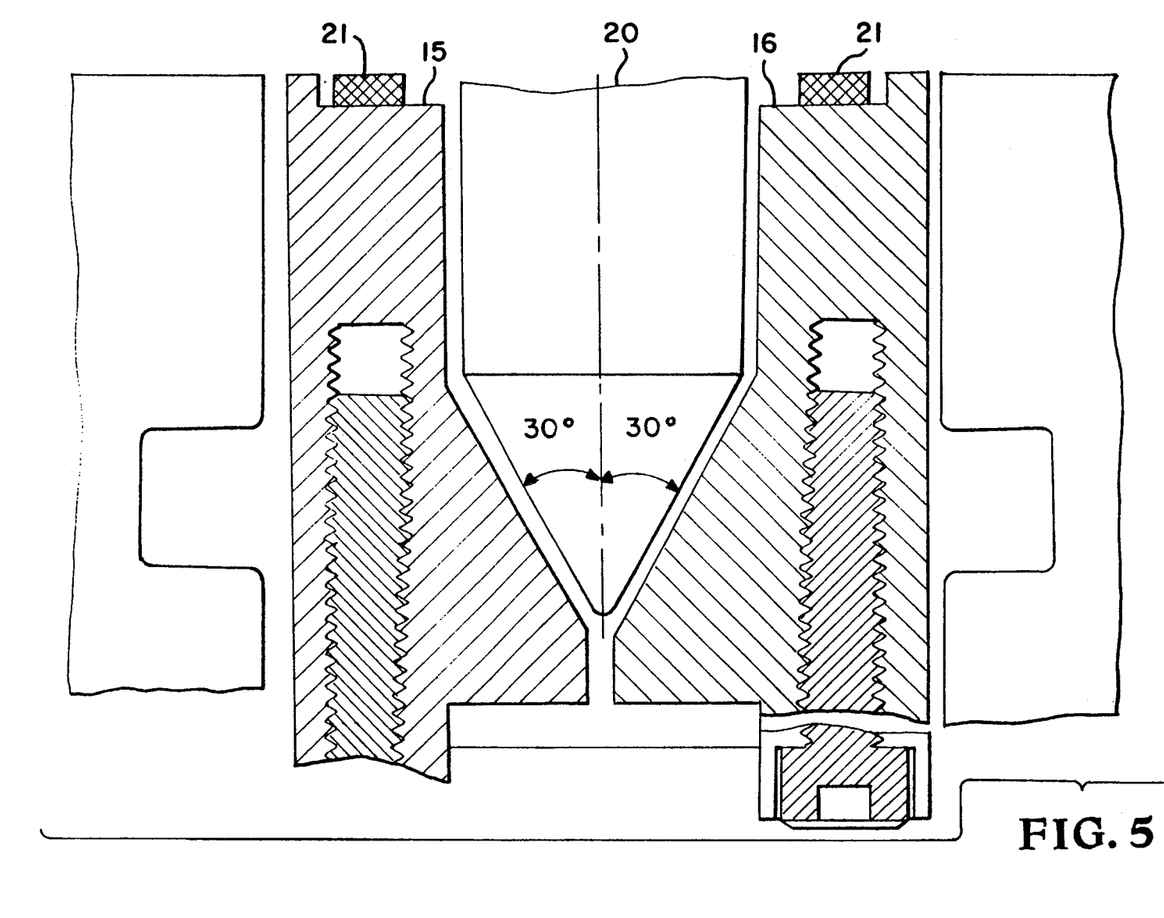
FIG. 5 is a detailed view of the arrangement of the tripping anvil and its associated trippers.

Details on tripping mechanism 5 are shown in FIGS. 3, 4 and 5. When the command to unlock is given (i.e., windings 6 supplied with current), windings 6 lift striker disk 14 which lifts two trippers 15, 16 in each of the tripping mechanisms 5. These trippers 15 and 16 remain in constant contact with trip anvil 20 along an inclined plane, and with rollers 12 and 13. Each trip anvil 20 is fixed to reaction ring 4. Each tripper 15, 16 is spring-loaded by way of lifter return spring 21 against striker disk 14. As trippers 15, 16 move upwards with striker disk 14, each is deflected towards closing its respective locking gap by the inclined plane interface between each tripper 15, 16 and its corresponding anvil 20. When the locking gaps are eliminated, locking rollers 12, 13 are disengaged and disk 17/output drive shaft 2 rotates freely. To permit trippers 15, 16 to travel outward sufficient to close the gaps with locking rollers 12, 13, only a modest air gap of approx 0.025 is used between windings case 22 and striker disk 14, therefore the locking angle inside tripping mechanism 5 must be large. On the other hand, the inclined plane angle in tripping mechanism 5 uses a locking angle. Thus, tripping forces, no matter how large, will not back-drive trippers 15, 16 and keep the system from unlocking. Tripping mechanisms 5 must operate in a relatively slippery lubricant which necessitates a small locking angle because locking rollers 12, 13 with their high contact stresses must operate in a smooth lubricant to prevent galling and cold welding. This is resolved by using the three-way compound angle shown in FIGS. 3 and 5. The angle between trippers 15, 16 and anvil 20 is 15 degrees in the top view (FIG. 3) and 30 degrees in the cross section view (FIG. 5). This gives an effective angle of 8.6 degrees between the direction of movement of striker disk 14 and the normal to the surface of the interface between tripper 15, 16 and anvil 20 and it is this angle which is the effective locking angle. Still, tripper 15, 16 does close the gap between it and roller 12, 13 based upon the 30 degree angle shown in the section view of FIG. 5. When we take into consideration that the friction between roller 12,13 and tripper 15,16 also prevents tripper 15,16 from back-driving and this angle is zero degrees, the net effect is a locking condition.

Striker disk 14 is split into several sections; one per tripping mechanism. Each section 14 is pushed away from the tripping mechanism by lifter return springs 21. When coil 6 is activated, each section 14 will independently activate its tripping mechanism. Thus all locking rollers 12/13 will be essentially engaged simultaneously and independently and shaft 2 will rotate freely. Shortly afterwards, striker disk sections 14, which activates tripping mechanism 5, will bottom on reaction ring 4 and tripping mechanisms 5 will reach the end of their stroke. Because striker disk sections 14 are bottomed, the magnetic circuit (shown by the arrows in FIG. 4) will be essentially closed on near zero gap, the current in windings 6 will be much reduced, and Trip Roller Clutch 10 can be held in unlock indefinitely. When windings 6 are deactivated, lifter return springs 21 will drive tripping mechanisms 5 and striker disk sections 14 down and the system will return to a locked state.

The excellent frequency response and high mechanical efficiency of the system inherent in roller locking will permit it to lock and unlock precisely on the desired torque under sensory interactive computer control. This also permits the system to open and close repeatedly and quickly in a pulsating manner. Thus it can maintain precise torques or release under impending slip as in an automotive anti-lock braking system. For magnetic circuits, keeping the gap between windings casing 22 and striker disk 14 at a minimum is critical. A large gap creates large losses due to magnetic flux fringing. It also forces more current and/or windings to be employed. This, in turn, increases size and weight. However, as shown in FIG. 2, using a roller locating spring 7 to precisely set and maintain the gap between locking rollers 12, 13 and their respective tripping mechanisms 5 and (in conjunction with preload spring 9 and locking cams 11 on rollers 12, 13), using a rotating technique, to keep locking rollers 12, 13 engaged at all times minimizes these effects. The cylindrical surfaces of each of locking rollers 12, 13 facing its respective tripping mechanism 5 and the design of the cam lobe 11 of each locking roller 12, 13 at the point where that roller contacts its roller locating spring 7 means that the locking gap is unchanged during these rotary adjustments. This removes uncertainty, and so reduces the amount of lift (and air gap) required in the magnetic circuit. As described above, using a three dimensional surface contact between each tripper 15, 16 and its corresponding anvil 20 permits tripper 15, 16 to operate in a slippery lubricant and still use what is effectively a large locking angle, further reducing the need for a large gap in the magnetic circuit.

A detailed view of the magnetic circuit and striker disk sections 14 is shown in FIG. 4. FIG. 3 shows top view detail. Taken together, these give perspective on how the machining can be effectively done, particularly with respect to reaction ring 4. It also shows how and where the springs (to locate and preload the locking rollers) and the tripping mechanisms are located.

When Trip Roller Clutch 10 is resisting torque, locking rollers 12, 13 roll very slightly up their locking cam lobes 11 and, in the process, deform locking rollers 12, 13 and reaction ring 4 slightly, in the radial direction. A clearance between tripping mechanism 5 and locking rollers 12, 13 must exist during roller locking in order for this locking process to occur. The magnetic circuit and striker disk sections 14 must provide the vertical lift sufficient to permit tripping mechanism 5 to overcome this clearance and engage and unlock locking rollers 12, 13 at any instant. Therefore each striker disk section 14 vertical lift is proportional to the locking gap between tripping mechanism 5 and locking rollers 12, 13 as measured along the circumference of the contact surface of reaction ring 4.

ADVANTAGES of the INVENTION over the PRIOR ART

The performance of Trip Roller Clutch 10 will be much better than conventional friction-hold electromagnetic brakes/clutches. As a brake, Trip Roller Clutch 10 will be an order of magnitude stronger in its holding torque capabilities than a comparably sized friction-hold device. It will also be more predictable, e.g., if some lubricant dripped on it, this will not radically disturb its performance as it would the friction-hold device. It will have a frequency response at least as good if not better. It will consume low power and will operate indefinitely with the power on. Also, it will remain cool during operation. It will release under load more reliably that a friction-hold device. Compared to a magnetic particle brake, Trip Roller Clutch 10 will be much more capable of holding large torques, will be much simpler and will not require seals to prevent the magnetic particle powder or fluid to escape. It will not wear out as fast (the magnetic particles grind down in use and lose their effectiveness). Compared to a hydraulic brake, Trip Roller Clutch 10 will be comparable in torque capabilities and will release as reliably under loads. It will be at least as immune to the effects of having lubrication dropped on it. It can operate longer and cooler with the power on continuously. It will have a quicker frequency response. It will consume much lower power. The main advantage it has over hydraulic brakes is that it does not require a hydraulic support system and all that goes with it, i.e., tubing, compressor, valves, etc. Compared to a toothed electromagnetic brake, Trip Roller Clutch 10 will be comparable in holding torque, but will be able to release reliably under loads, something the toothed brake is very weak on because of frictional buildup on the teeth. Also, it will have a continuous and infinite number of positions whereas the toothed brake has only discrete positions. Trip Roller Clutch 10 will consume less power and operate cooler.

As a slip clutch and torque limitation device, Trip Roller Clutch 10 will be superior to all prior art devices. All friction-hold brakes, electromagnetic, magnetic particle or hydraulic, have considerable slippage. This is true even if anti-slip braking techniques are used. And this means that a great deal of heat is generated. This heat brings wear with it. This slippage also make the process less predictable and precise and reduces the speed (frequency response). A toothed brake should never be considered in this role. Trip Roller Clutch 10 is very efficient (better than 90%) and so is very predictable and cool in operation. Also its wear capabilities will be outstanding as will its frequency response.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. An electromagnetic brake/clutch device comprising:
   a drive shaft supported by at least one bearing for transmitting torque, said drive shaft including a circumferential disk;
   affixed housing means surrounding said drive shaft, said housing means including a reaction ring;
   electromagnetically activated means within said housing to selectively prevent and allow rotation of said drive shaft;
   said electromagnetically activated means including a first plurality of cammed rollers acting to prevent clockwise rotation of said drive shaft, a second plurality of cammed rollers to prevent counterclockwise rotation of said drive shaft, and a plurality of tripping mechanisms, each of said plurality of cammed rollers located with respect to its adjacent tripping mechanism by a first spring;
   said circumferential disk and said reaction ring in selective engagement with said first and second plurality of cammed rollers such that said first and second plurality of cammed rollers are released from engagement with said circumferential disk and said reaction ring by said plurality of tripping mechanisms.

2. The device of claim 1 wherein each of said plurality of tripping mechanisms acts independently.

3. The device of claim 2 wherein each said tripping mechanism includes a first tripper for disengaging said first plurality of cammed rollers and a second tripper for disengaging said second plurality of cammed rollers, said tripping mechanism also including an anvil shaped portion for providing lateral movement of said first and second trippers.

4. The device of claim 3 wherein each said plurality of cammed rollers is preloaded to engagement with said circumferential disk and said reaction ring by a second spring.

5. The device of claim 4 wherein said electromagnetically activated means includes a plurality of windings around said plurality of tripping mechanisms.

6. The device of claim 5 wherein said electromagnetically activated means includes a translating annular disk divided into sections, one per tripping mechanism, selectively engaging with said tripping mechanisms.

7. The device of claim 6 further including a third spring providing a downward force on each of said tripping mechanisms.

8. The device of claim 2 wherein said first and second plurality of cammed rollers are independently engaged.

* * * * *